Aug. 4, 1953 J. L. STOTT 2,647,363
COMBINED INTERNAL-COMBUSTION ENGINE AND TURBINE
Filed Oct. 28, 1948 3 Sheets-Sheet 1
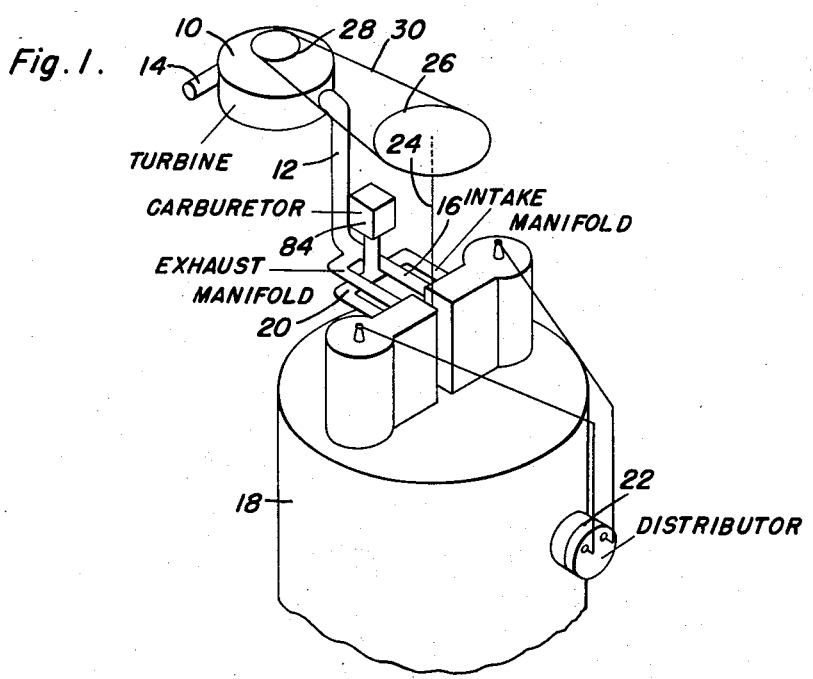
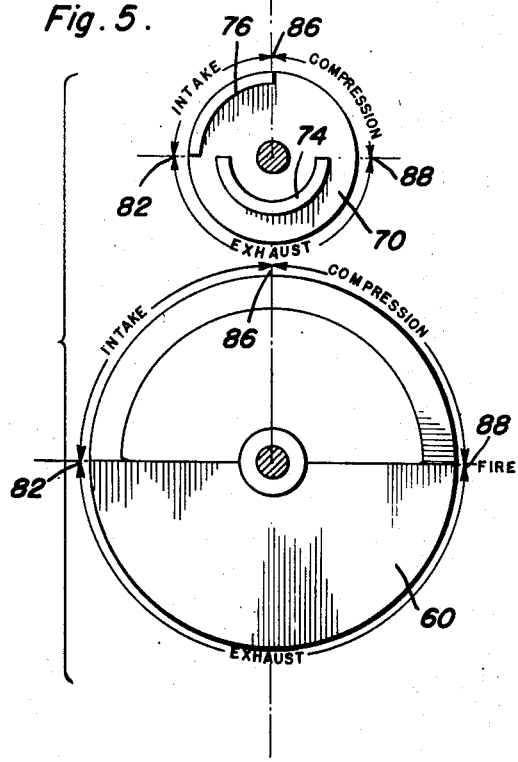
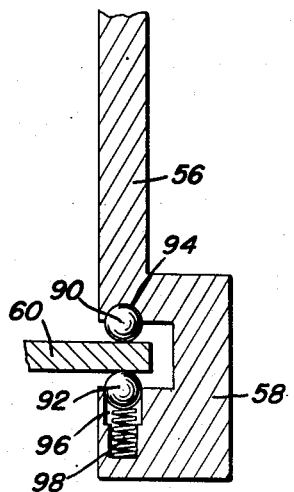
Inventor
John Lawrence Stott
By *Clarence A. O'Brien
and Harvey B. Jacobson*
Attorneys

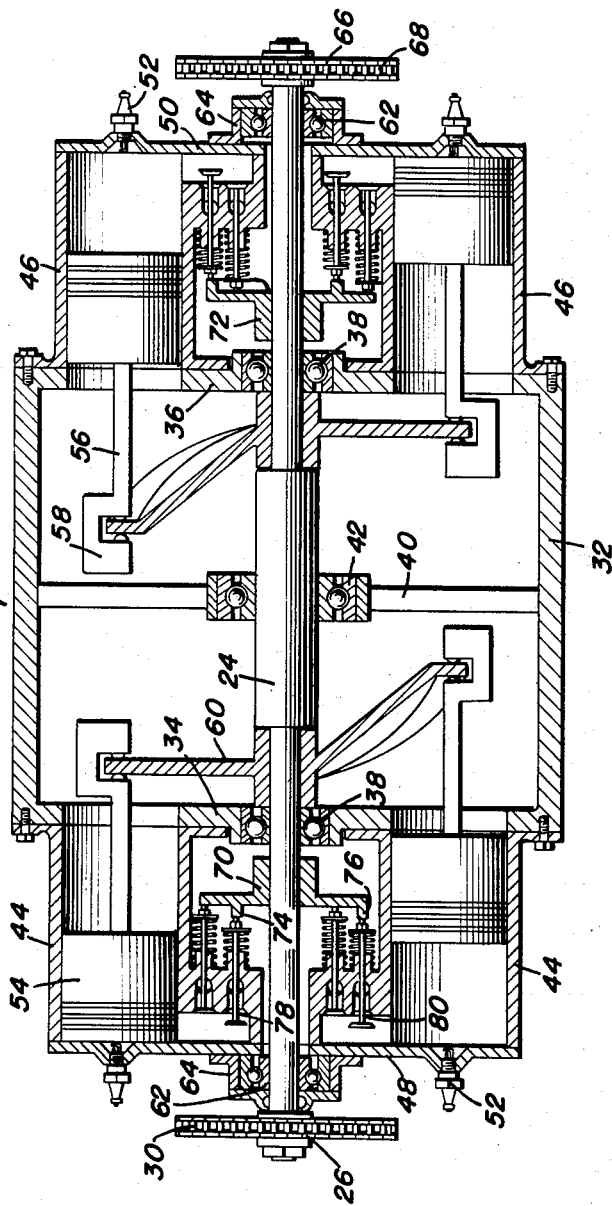

Aug. 4, 1953 J. L. STOTT 2,647,363
COMBINED INTERNAL-COMBUSTION ENGINE AND TURBINE
Filed Oct. 28, 1948 3 Sheets-Sheet 3

Inventor
John Lawrence Stott

By *Clarence A. O'Brien
and Harvey B. Jacobson*
Attorneys

Patented Aug. 4, 1953

2,647,363

UNITED STATES PATENT OFFICE 2,647,363

COMBINED INTERNAL-COMBUSTION ENGINE AND TURBINE

John Lawrence Stott, Saranac Lake, N. Y.

Application October 28, 1948, Serial No. 57,003

3 Claims. (Cl. 60—13)

This invention comprises novel and useful improvements in a combined internal combustion engine and turbine and more specifically pertains to a power plant or combustion engine in which is combined a combustion gas generator and an exhaust gas driven turbine in a novel and improved manner for more efficiently utilizing the energy developed by exploded charges of a combustible mixture.

The primary object of this invention is to provide a power plant or engine in which power is more efficiently derived from a sequence of combustion charges of combustible mixture and in a device having a relatively small number of parts.

A further important object of the invention is to provide a power plant consisting of an exhaust gas turbine and a combustion products generator for supplying exhaust gas thereto in which the combustion generator is driven entirely and solely by the turbine, and in which the cycle of operations within the generator are effected in timed relation to rotation of the turbine.

An important feature of the invention resides in the provision of a combustion gas generator consisting of a plurality of cylinders disposed parallel to a driving shaft and connected thereto for reciprocation of the cylinders in response to rotation of the drive shaft, together with means for admitting combustible charges into the cylinders, compressing and exploding the charges, maintaining the pistons stationary during a dwell period at the end of the compression stroke and throughout the combustion period while the products of combustion are being discharged to the turbine for driving the same, together with an operative connection between the turbine and the shaft for rotating the latter from the former.

An important feature of the invention further resides in the provision of an improved mechanical movement for connecting the reciprocating pistons to the rotating shaft in a particular timed relationship for effecting intake and compression strokes of predetermined duration together with a dwell period of a greater extent than either of the intake or compression periods and preferably at least equal to the sum of these two periods.

These, together with various ancillary features and objects of the invention which will later become apparent as the following description proceeds, are attained by this device, a preferred embodiment of which has been illustrated by way of example only in the accompanying drawings, wherein:

Figure 1 is a diagrammatic perspective view illustrating generally the manner of operatively connecting the turbine and the combustion gas generator for their combined operations;

Figure 2 is a vertical longitudinal central sectional view through the combustion gas generator showing the interior construction, the valve operating means and the piston cam actuating means of the device;

Figure 5 is a diagrammatic view illustrating the valve operating cams in relation to the cycle of operation of the device; and Figure 6 is a fragmentary sectional detail view showing the manner of attaching a piston connecting rod to the piston actuating cams of the device.

Figure 3:
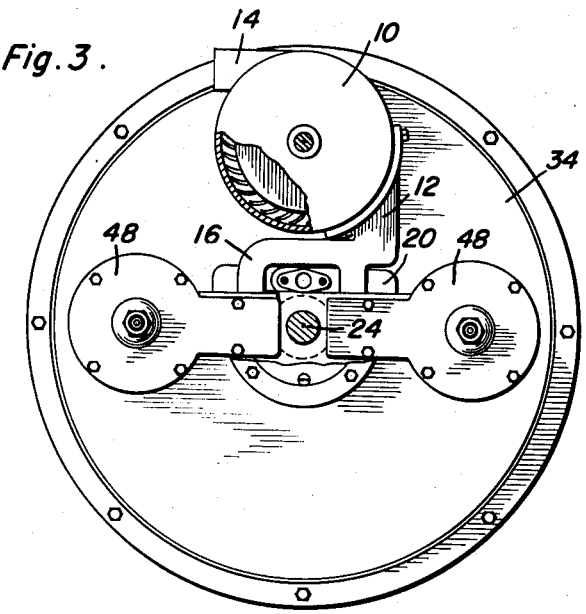
Figure 3 is an end elevational view of the arrangement shown in Figure 1, a part of the turbine casing being broken away to show the interior construction thereof.
Figure 4:
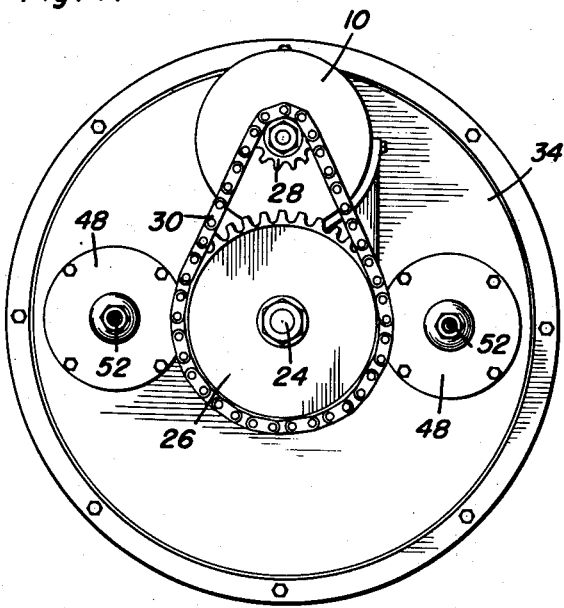
Figure 4 is an end elevational view of the arrangement shown in Figure 1, taken from the opposite end to Figure 3, disclosing the manner of coupling the turbine to the combustion gas generator.

Referring now more specifically to the accompanying drawings, wherein like numerals designate similar parts throughout the various views, attention is directed first to Figure 1 which illustrates the fundamental principles of the invention and in which there is disclosed an exhaust gas operated turbine 10 of any conventional dedesign, which is provided with an exhaust gas inlet pipe 12 and an exhaust pipe 14, which inlet pipe is shown connected to the exhaust manifold system 16 of the combustion gas generator 18. Indicated at 20 is an intake manifold system for supplying combustible charges to the combustion gas generator 18, while the numeral 22 designates generally an electrical distributor of any suitable type for distributing the electrical ignition impulses to spark plugs or other igniters in the various combustion chambers of the combustion gas generator.

The combustion gas generator is provided with an axially disposed drive shaft indicated generally at 24 which is provided with a sprocket wheel or gear 26 which is connected to a driving sprocket 28 on the turbine 10 as by a sprocket chain 30, whereby the drive shaft of the combustion generator will be operated by and in synchronized relation to the rotation of the shaft of the turbine.

It should be understood that the principles of the invention may be applied to a combination wherein an exhaust gas operated turbine 10 may be driven by any desired number of combustion chambers of the combustion gas generator, and in Figure 2 there is shown one suitable embodiment of combustion gas generator, although it is to be understood that the principles of the invention are not limited to this arrangement which has illustrated solely an exemplification of the principles and spirit of the invention.

Referring now more specifically to Figure 2 wherein the construction of a novel combustion generator which may be employed in accordance with the principles of this invention is disclosed, it will be seen that the generator indicated generally at 18 includes a casing or body 32 which may be conveniently of a drum-like shape and which has end partitions or walls 34 and 36 within which is suitably journaled in anti-friction bearings 38 an axially disposed rotatable driving shaft 24. If desired, the casing 32 may be provided with a central partition 40 in which the shaft 24 is further journaled as by a bearing 42. However, it is to be understood that in some instances the partition 40 and bearing 42 may be omitted as desired.

Secured to one or both of the end walls 34 and 36, are a plurality of cylinders 44 and 46, it being understood that any suitable number may be provided, which cylinders may be cast en block for each partition 34 and 36, or may be individually attached thereto as desired, and a common or a separate cylinder head 48 and 50 may be provided for the cylinder or cylinder blocks at each end of the engine.

Preferably, spark-plugs 52 or any other suitable igniting means may be mounted in the cylinder heads 48 and 50 in accordance with conventional practice for igniting the charges of combustible mixture which are introduced into the cylinders 44 and 46 as set forth hereinafter.

Reciprocatingly received in each of the cylinders 44 and 46 is a piston 54 which is provided with a connecting rod 56 having a yoke 58 at its inner end which is slidingly connected with a cam or wabbler disk 60 which is fixed to the shaft 24. By means of this cam or wabbler disk, the continuous and constant rotation of the shaft 24, which as above mentioned is driven by the turbine 10, effects a reciprocating motion of the pistons 54 in synchronized relation to rotation of the shaft 24 and hence of the turbine 10.

The ends of the drive shaft 24 may be further journaled in suitable bearings 62 received in bearing cages 64 mounted upon the outer surfaces of the cylinder heads 48 and 50, and the ends of the shaft extend therebeyond for the reception of the above mentioned driven sprocket 26 to which the driving sprocket chain 30 is attached, and to a power take-off sprocket 66 which may be provided with a sprocket chain 68 coupled to any desired machine for driving the same.

As so far described, it will thus be seen that the rotation of the turbine 10 will cause a rotation of the shaft 24 and hence a reciprocation of pistons 54 in timed and synchronized relation thereto by means of the sprocket chain 30, and that power may be taken off from the shaft 24 by means of the sprocket and chain 66 and 68.

Obviously, if cylinders are provided at one end only of the casing 32, it will be evident that only cam or wabbler 60 is necessary; while if cylinder banks are provided at both ends of the casing 32 it will be necessary to provide duplicate wabblers or cams 60.

Secured to the shaft 24 between the cylinders 44 and 46, are valve operating cam plates 70 and 72, having arcuate axially disposed cams 74 and 76 which operate valves 78 and 80 respectively which may constitute a combustible mixture admission and exhaust products exhaust valves of the cylinders.

These valves may be of any suitable type, and for convenience of illustration spring closed poppet valves of a well known design have been illustrated, although it is to be understood that the invention is not limited to this particular type of valve but that all equivalent valve mechanisms may be employed. However, it is to be emphasized that the valves are operated in synchronization with the position of the pistons 54 in their individual cylinders since the valve actuation and piston actuation are both timed by the cam members carried by the driving shaft 24.

It is to be distinctly understood that the valves control intake and exhaust conduits, and that these conduits merge into a common intake manifold and a common exhaust manifold at each end of the engine as shown in Figure 1.

The distributor 22 is likewise connected to the driving shaft 24 for operation in synchronization therewith, whereby the initiation of combustion in each cylinder will occur in properly timed relation to the position of the piston therein.

It should be here noted that the explosion within the combustion chambers of each of the cylinders is incapable of causing rotation of the shaft 24 as a direct result thereof, but is solely for the purpose of producing combustion products which are delivered to the exhaust gas turbine 10 for operating the latter, which in turn serves to drive the shaft 24 for causing the cyclic operation of the pistons in a manner to be now set forth.

It is well known that in employing combustion charges in an engine for obtaining power, that considerable power is lost by reason of the fact that when the charges are exhausted to the atmosphere, they still retain considerable potential and thermo-dynamic energy therein. Obviously, if, in the ordinary piston engine full utilization could be made of the expansive power of the exploded charges, a more efficient engine would result. However in such engines in view of the limited time in which the exhaust gases must expand and do their useful work on the piston, it is impossible to fully utilize all of the energy of the charges.

In the present device however the cams or wabbler plates 60 are employed to impart to the pistons an intake or suction stroke, a compression stroke, and then to hold the piston stationary during a dwell period in which combustion and exhaust of the charges is effected. For this purpose, a predetermined portion of the cam 60 which may conveniently be at least one half of the circumference of the cam, and in some instances an even greater proportion of the cam circumference, is disposed in the same radial plane whereby the pistons are held against movement; while the remaining surface of the cam is provided with reaches for effecting the intake and the compression strokes of the piston. A convenient angular relation of the intake and compression reaches and the cam dwell period is indicated in Figure 5, and the relation of the valve actuating cams 74 and 76 thereto is also depicted. Thus, at the point 82 in the angular rotation of the shaft 24, the cam plate 60 and the valve cams 70 or 72, the pistons begin their inward or intake stroke for drawing in a charge of combustible mixture through the intake manifold from any suitable charge forming device such as a carbureter 84, see Figure 1, through the intake valves 80, until the completion of the intake stroke at the point 86, which is the position shown at the lower left hand cylinder of Figure 2, at which time the pistons start their compression stroke, the intake valves closed. From the position 86 to that indicated at 88, the pistons move inwardly on their compression stroke, whereby the inducted charge is now compressed in readiness for ignition. During this time, all of the valves are closed. At the point 88, ignition is effected by the distributor 22 through the agency of the spark plug or other igniters 52 by an ignition system of any conventional design, the details of which have not been illustrated as forming no part of this invention.

Coincident with or shortly after the period of ignition, and beginning with the position 88, the exhaust valve cam 74 opens the exhaust valve 78 whereby the combustion charge may commence its flow into the exhaust turbine through the ducts 12. At this time, the radial portion of the cam plate 60 maintains the pistons 54 at their innermost position at the completion of the exhaust stroke, thus producing a dwell of the pistons which as above mentioned may be of any desired extent. The pistons are thus held inwardly until the entire combusted charges are delivered through the duct 12 into the turbine for driving the same.

At the completion of the travel from the points 88 to 82, the shaft 24 has completed its revolution, and the pistons are ready to commence their next cycle of operations.

As will be noted from Figure 2, the pistons 54 at the end of their inward or compression stroke are in substantial contact with the cylinder heads 48 and 50 to provide only a working clearance therebetween, since no appreciable clearance for combustion chamber volume is necessary at this point, since the space above the valves will provide the necessary combustion space.

Reference is next made to Figure 6 where it will be seen that the connecting rod 56 which may be rigidly and integrally formed with the yoke 58 is provided with an anti-friction connection with the cam disk 60. For this purpose, the plate 60 is received within the yoke 58, and is engaged by a pair of anti-friction balls 90 and 92, received in recesses or ball retaining sockets 94 and 96. One of the sockets such as the socket 96 may have a compression spring 98 received therein whereby the ball 92 may be resiliently urged against the cam plate 60 to take up wear between the balls and the plate.

From the foregoing, the construction operation of the device will be readily understood and further explanation is believed to be unnecessary.

However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. A combustion products generator comprising a tube having end walls removably attached thereto, said end walls having apertures therethrough in communication with hollow cylinders integral with said end walls and having an outer wall, igniting means secured in said outer wall, a shaft journalled in said end walls and said outer wall, a piston secured in each of said cylinders, rods secured to said pistons, an orifice in each of said cylinders in communication with a common duct, valves in said common duct, cams secured to said shaft between said end and outer walls for actuating said valves, and wabbler disks secured to said shaft for selective actuation of said pistons upon rotation of said shaft, means driving said shaft, and power take-off means connected to said shaft.

2. A combustion products generator comprising a tube having end walls attached thereto, said end walls having apertures therein in communication with hollow cylinders having outer walls, said cylinders being secured to said end walls, igniting means secured in said outer walls, valve means selectively opening and closing communication between said cylinders and a common duct, a shaft journalled in said end walls and said outer wall, cams secured to said shaft between said end walls and said outer walls for actuating said valve means, pistons secured in said cylinders, rods secured to said pistons and extending through said end walls and wabbler disks secured to said shaft engaging said rods for selective actuation of said piston upon rotation of said shaft.

3. A combustion products generator comprising a tube having end walls attached thereto, said end walls having apertures therein in communication with hollow cylinders having outer walls, said cylinders being secured to said end walls, igniting means secured in said outer walls, valve means selectively opening and closing communication between said cylinders and a common duct, a shaft journalled in said end walls and said outer wall, cams secured to said shaft between said end walls and said outer walls for actuating said valve means, pistons slidably emplaced in said cylinders, rods secured at one end thereof to said pistons, the other ends of said rods extending through said end walls, spring retaining means secured to said rods engaging wabbler disks secured to said shaft, said wabbler disks causing oscillating movement of said piston upon rotation of said shaft.

JOHN LAWRENCE STOTT.

References Cited in the file of this patent

UNITED STATES PATENTS

| Number | Name | Date |
|---|---|---|
| 836,945 | Poole | Nov. 27, 1906 |
| 1,308,373 | Rombach | July 1, 1919 |
| 1,381,188 | Gury | June 14, 1921 |
| 1,603,852 | Michell | Oct. 19, 1926 |
| 1,819,137 | Thompson | Aug. 18, 1931 |
| 1,885,323 | Duryea | Nov. 1, 1932 |
| 2,276,772 | Heap | Mar. 17, 1942 |